INVENTOR
JOHN S. NELSON

ATTORNEYS

Jan. 28, 1958   J. S. NELSON   2,821,064
APPARATUS INCLUDING MEANS FOR FEEDING A
CHAIN TO A SPRUE TRIMMER
Filed June 8, 1955   2 Sheets-Sheet 2

INVENTOR
JOHN S. NELSON

BY

ATTORNEYS

United States Patent Office 2,821,064
Patented Jan. 28, 1958

2,821,064

APPARATUS INCLUDING MEANS FOR FEEDING A CHAIN TO A SPRUE TRIMMER

John S. Nelson, Grand Island, N. Y.

Application June 8, 1955, Serial No. 513,964

6 Claims. (Cl. 59—29)

This invention relates to chain casting machines and more particularly to mechanism for cutting off and machining cast chain links such as described in my copending application, Serial No. 366,445, now Patent No. 2,764,790 issued October 2, 1956. In the aforesaid application, a novel method and apparatus is disclosed for making cast chains of aluminum or bronze and wherein a permanent mold is utilized in the manufacture of the chain links. The present invention appertains to an auxiliary machine for removing the cast sprue or gate portions which remain on the connecting links of the chain after removal of the casting from the permanent mold.

In the casting of aluminum or bronze chains employing permanent molds as described in my prior application, chains of any desired length and link size may be mass produced. During the casting of links for connecting adjacent cast links to form a chain of the desired length, molten metal is poured into the molten cavity through a suitable gate. A sprue of metal is necessarily left on each cast link. This invention provides a machine for removing this casting sprue from these connecting chain links quickly and efficiently to produce a finished chain.

It is, accordingly, an object of this invention to provide a machine through which such a cast aluminum or bronze chain may be drawn or moved and the links ground and machined to remove the residual sprue left on the cast links.

Another object of the invention is to provide a machine for abrading off and machining cast aluminum chain links to produce a finished chain wherein the links are given a smooth and even machined surface.

Another object of the invention is to provide a machine for receiving and guiding a chain having links to be machined and which is engaged and held in position while machined.

Another object of the invention is to provide a machine of the character described in which the chain may be fed directly from a permanent mold casting machine and the solid sprue or gate portion formed on the connecting cast chain links cut off and machined to form a finished chain.

These and other objects and advantages of the invention will become apparent from the following description wherein a preferred embodiment of the invention is illustrated and described. The novel features of the invention will be best understood when taken together with the accompanying drawings in which.

Figure 1:
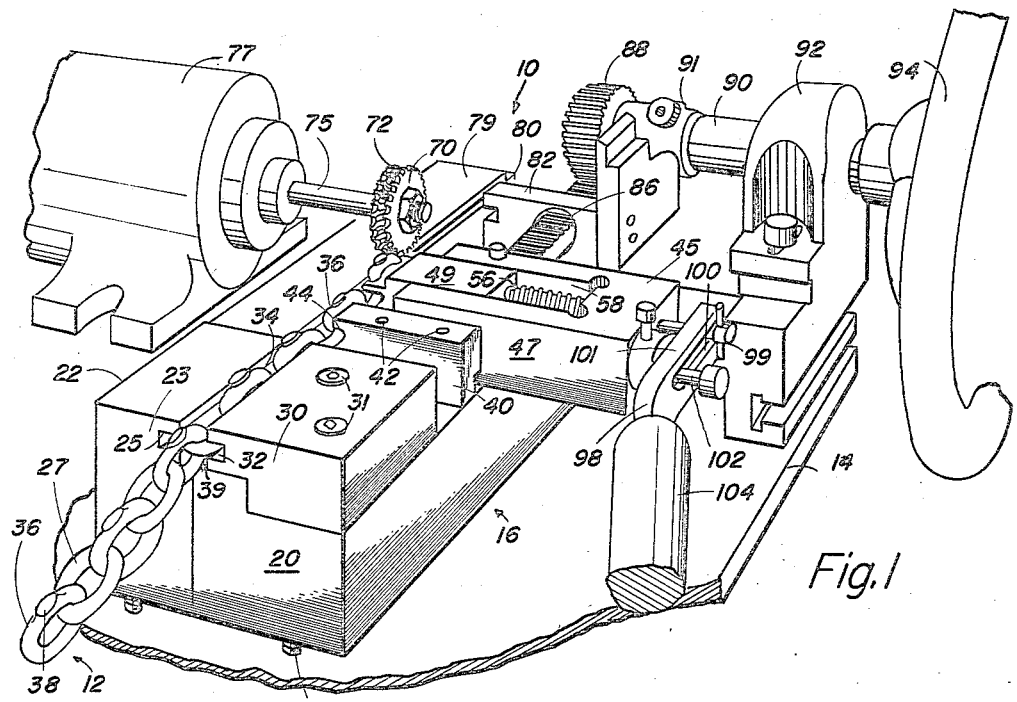
Figure 1 is a plan view in perspective of one embodiment of machine for removing sprues from cast chain links and machining the same, as described, certain parts of the machine being broken away in the interest of clearness.

Referring to the drawings and particularly to Figures 1 to 5, there is shown a machine for cutting-off and machining a cast aluminum chain 12. The machine comprises a table or work supporting platform 14 on which is mounted a chain guide and holder means, generally illustrated at 16, and which is fastened to the supporting table 14 by means of screws 17. This chain guide and holder mechanism comprises a plurality of inter-fitting block members 20 and 22, the latter being provided with an integral head portion 23 having an elongated open-ended slot or groove 25 for receiving and guiding therealong links 27 of the cast chain 12, as illustrated in Figure 1. A cooperating head block 30 having a similar longitudinal slot or groove 32 for accommodating the opposite side portion of the chain links 27 is mounted on the block 20, as by means of bolts 31.

The open-ended slots or grooves 25 and 32 cooperate and permit the chain links 27 to slide therethrough as the chain 12 is moved into position to be machined. An open-ended slot 34 is also provided between the head block portions 23 and 30 to accommodate the vertically disposed chain links 36, the slot 34 being shallow enough to expose the sprue portions 38 whereby the same can be machined off. The chain slot 34 is in the shape of a cross as viewed in cross-section and the cooperating side grooves 25 and 32 are under-cut beneath the surface of the inter-fitting block members 20 and 22. The lower or bottom groove 39, as shown in Figure 1, accommodates the lower half of the vertically disposed chain links 36 while the upperpost portion of slot 34 is open to expose the upper part of the chain links having a sprue 38 which is to be milled off. In the chain illustrated in Figure 1, it is to be understood that the cast sprue portions 38 on the horizontal links 27 have been previously cut off and machined prior to casting the connecting links 36 to form a chain of desired length.

Suitably positioned on the block 20, as illustrated in Figure 1, is an adjustable chain guide block 40 which is suitably secured in place as by means of stud bolts 42. For guiding the chain links therealong through the machine the head block 40 is provided with a groove 44 at its inner end, similarly as guide block 30, which is adapted to receive the horizontally disposed links 27 and support and guide the chain therealong.

Arranged adjacent to the chain guide block 40 is a cylinder block 45. This block comprises an open-ended portion 47 in which is slidably mounted a chain holder member 49. The chain holder member 49 is provided with an integral flange portion 50 extending the length of the block at its opposite sides which engage in like shaped grooves 52 in the chain block 45. This construction permits the chain holder block 49 to slide back and forth in the block 45 as required as successive links are machined.

Figure 3:
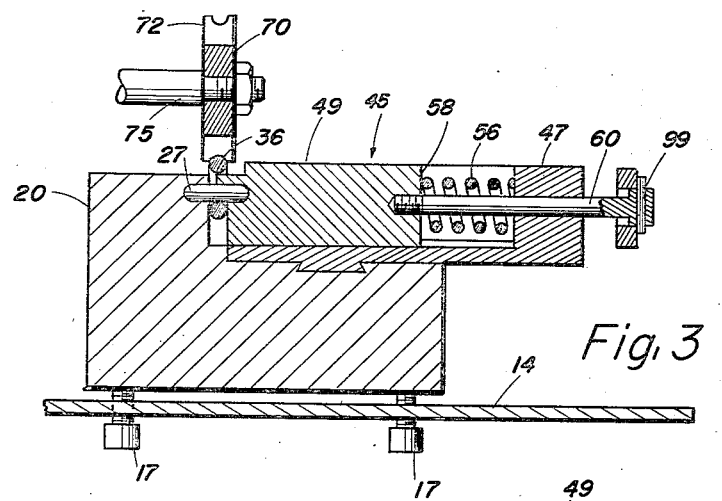
Figure 3 is a fragmentary sectional view drawn on an enlarged scale, the same being taken substantially on the line 3—3 of Figure 2 and looking in the direction of the arrows.
Figure 4:
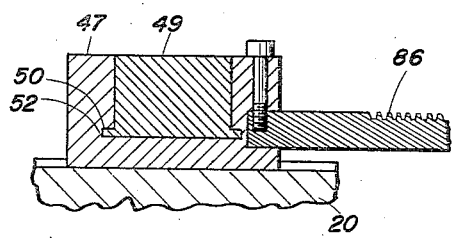
Figure 4 is a fragmentary sectional view taken on the line 4—4 of Figure 2 and looking in the direction of the arrows.

To yieldably press the chain holder block 49 outwardly and in position to engage and hold the chain links during the machining operation, a coil spring 56 is arranged in the opening 58 of the chain holder 45, the same being carried by a stem 60 suitably threaded into the block 49, as best shown in Figure 3.

Figure 2:
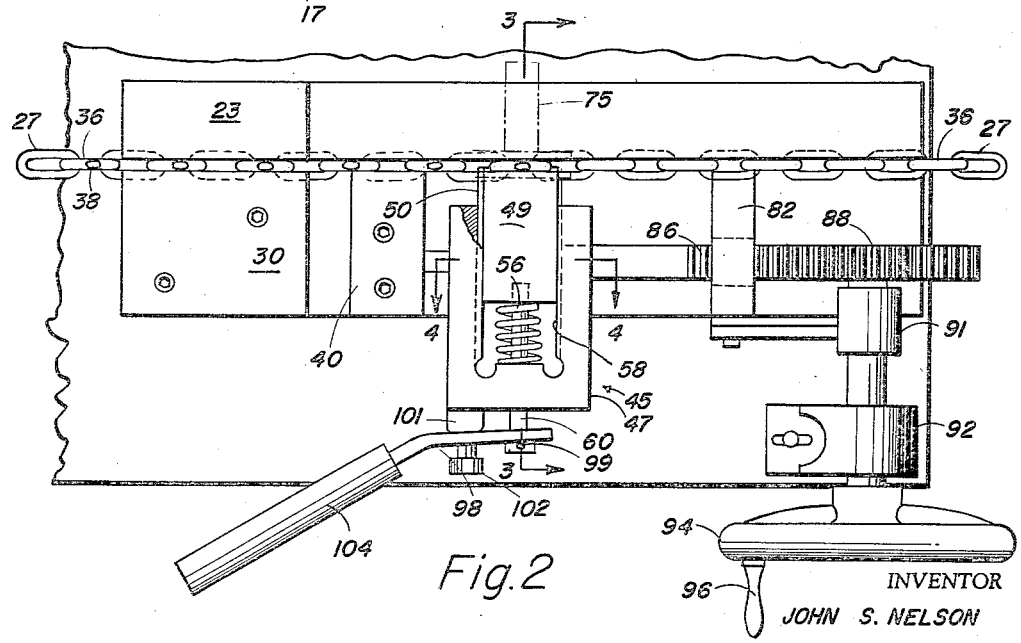
Figure 2 is a plan view partly broken away of the machine shown in Figure 1.

As illustrated in Figure 2, the reciprocable chain holder block 49 is urged to slide outwardly of the block 45 and interlock with each successive chain link 36 preparatory to being machined.

Figure 5:
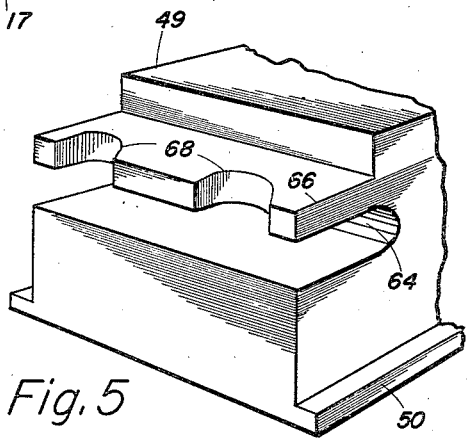
Figure 5 is a fragmentary view in perspective of the reciprocable chain block holder and looking at the working end thereof, the same being drawn on an enlarged scale and partly broken away.

To support and hold the individual links 36 while the same are worked on, the holder block 49, as best shown in Figure 5, comprises a U-shaped elongated link-receiving slot 64 and projecting shelf portion 66, the latter comprising spaced grooves 68 for engaging the opposite ends of a chain link to be machined, as links 36. The U-shaped elongated slot 64 is shaped to receive a horizontally disposed link, such as link 27, of the chain, which links are connected by the links 36.

Mechanism for cutting and abrading off the sprue portion 38 on the chain links 36, as illustrated in Figure 1, comprises a milling cutter tool 70. This milling tool preferably comprises a U-shaped head 72 for cutting off the sprue and machining the links, as illustrated in Figure 3.

Milling tool 70 is mounted on a shaft 75 and arranged to be driven by a motor 77 suitably supported on the table 14. Chain block guide means 79 is provided at the opposite end of the block member 20 and being similarly slotted, as at 80, which is adapted to form a continuation of groove 25 and receive and guide links 27 as the chain is advanced to the milling tool 70. Cooperating chain guide block means 82 is also provided to support and guide the chain therealong after being machined.

Mechanism for moving the chain block holder 45 back and forth during the milling operation comprises a rack 86 which is secured to block 45 and pinion gear 88. Pinion gear 88 is keyed to a shaft 90 which is suitably journaled at 91 and 92, as shown in Figure 1. Disposed on the outer end of the shaft 90 is a hand wheel 94 for rotating the pinion gear 88 to shift the chain block 45 as required to move the chain to the milling tool 70. A handle means 96 on the wheel 94 facilitates this operation of the rack and pinion gear to move the chain link back and forth.

For reciprocation of the chain block 49 against the spring 56, as required for positioning the chain, a lever 98 is provided, as shown in Figure 1, and which is operatively connected to the outer end of the stem or rod 60, as at 99. The lever 98 is slotted as at 100 and is adjustably fastened to an abutment portion 101 on the end of block 45 by a pin 102. An elongated handle 104 is provided which facilitates withdrawing the chain guide holder 49 against the tension of the coil spring 56 as required for positioning the chain links to the milling tool.

Figure 6:
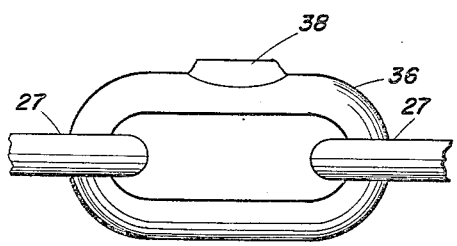
Figure 6 illustrates a chain link as cast and comprising a casting sprue portion which is to be removed by the machine of the present invention.
Figure 7:
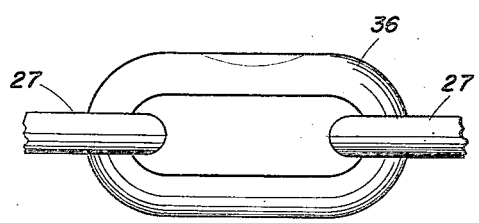
Figure 7 illustrates a finished chain link as shown in Figure 6 after the same has been machined with this invention.

Operation of the machine will be readily understood from the drawings and the foregoing description so that further explanation is believed to be unnecessary. As will be appreciated, the chain link 36, such as illustrated in Figure 6, having a cast sprue portion 38 is machined off and a finished chain produced, as illustrated in Figure 7. In this manner the chain links comprising sprue portions to be machined off are held in the vice-like holder and moved under the milling tool in succession. These links lie in a vertical plane whereas the connecting links lie in a plane at right angles thereto and are guided along while the adjacent links are being machined.

It will be understood that the machine may be modified to accommodate a different size chain link as well as chains made of various materials and wherein the principal axes of the links lie at greater or less than 90° angle. Such modification and arrangement for accommodating these different type chain structures may be made by those skilled in the art without departing from the scope and teachings of this invention and such as more particularly pointed out in the appended claims.

What is claimed is:

1. In a machine for cutting and machining the sprue portion from cast aluminum or bronze chain links in a chain length as said chain is moved past a milling station, a milling tool arranged at said station, said milling tool consisting of a rotary cutter having a U-shaped head portion for engaging the chain link and cutting off the sprue and machining the link, means for driving said milling tool, chain supporting means comprising a plurality of interfitting block members having cooperating slotted portion therein for receiving and guiding said chain length past said milling station, an adjustable chain guide block disposed on said chain supporting means having a slotted head portion cooperating with a portion of said slotted chain supporting means for guiding said chain therealong towards said milling station, a cylinder block comprising an open-ended portion arranged on one of said block members and adjacent to said chain guide block, a chain link holder member slidably mounted in said open-ended portion, said chain link holder member comprising a chain link receiving slot and cooperating shelf portion with longitudinally spaced grooves therein for engaging the opposite sides of a chain link having a sprue portion to be removed, and means for moving said chain link holder member in position to engage the chain link to be machined and clamp the link firmly in said chain supporting slotted means while said chain and link is moved as a unit past said milling station and said milling tool operated to machine off the sprue portion, said slot for slidably receiving the chain links being in the shape of a cross as viewed in cross section and wherein the cooperating elongated slots for accommodating the chain links are disposed below the surface of said chain supporting table and such as to accommodate both the horizontal and vertically disposed chain links and expose the sprue link portion above the top of said longitudinally extending open slot for the milling off of said sprue.

2. In a machine for cutting and machining the sprue portion from cast aluminum or bronze chain links in a chain length as said chain is moved past a milling station, said machine comprising a chain supporting table comprising a plurality of interfitting block members, said table having a longitudinally extending open slot arranged in abutting relationship for receiving and guiding said chain thereover, a chain guide block supported on said table and having a slotted head portion cooperating with said longitudinally extending slot for guiding said chain therealong to said milling station, a reciprocable block arranged on said table, a chain link holder member slidably mounted in said reciprocable block, said chain link holder comprising a head portion having an integral chain link receiving elongated slot and cooperating shelf portion adjacent thereto and being shaped to engage a chain link having a sprue portion to be machined off and slidably receive adjacent chain links, means for moving said chain link holder member in position to engage said chain link to be machined and clamp the same firmly in said longitudinally extending slot while said chain and link is moved as a unit therealong past said milling station, said slot for slidably receiving the chain links being in the shape of a cross as viewed in cross section and wherein the cooperating elongated slots for accommodating the chain links are disposed below the surface of said chain supporting table and such as to accommodate both the horizontal and vertically disposed chain links and expose the sprue link portion above the top of said longitudinally extending open slot for the milling off of said sprue.

3. In a machine for cutting and machining the sprue portion from cast aluminum or bronze chain links in a chain length as said chain is moved past a milling station, a rotary milling tool having a U-shaped cutting tool surface arranged at said station, means for driving said rotary milling tool, chain supporting means having an elongated open slot portion for receiving and guiding said chain length past said milling station, an adjustable chain guide block having a slotted head portion cooperating with said chain supporting open slot portion for guiding said chain therealong towards said milling station, a cylinder block comprising an open-ended portion, a chain link holder member slidably mounted in said open-ended portion, said chain link holder member having its outer end portion having an integral chain link receiving elongated slot and cooperating shelf portion adjacent thereto and being shaped to the opposite sides of a chain link comprising a sprue to be machined off and slidably receive adjacent chain links, and means for moving said chain link holder member in position to engage the chain link to be machined and clamped the same firmly in said chain supporting open slot portion while said chain and link is moved as a unit past said milling station and said milling tool operated to machine off the sprue portion, said slot for slidably receiving the chain links being in the shape of a cross as viewed in cross section and wherein the cooperating elongated slots for accommodating the chain links are disposed below the surface of said chain supporting table and such as to accommodate both the horizontal and vertically disposed chain links and expose the sprue link portion above the top of said longitudinally extending open slot for the milling off of said sprue.

4. In a machine for cutting and machining the sprue portion from cast aluminum or bronze chain links in a chain length as said chain is moved past a milling station a rotary milling tool having a U-shaped cutting tool surface arranged at said station, means for driving said rotary milling tool, chain supporting means having an elongated open slot portion for receiving and guiding said chain length past said milling station, an adjustable chain guide block having a slotted head portion cooperating with said chain supporting open slot for guiding said chain therealong towards said milling station, a block comprising an open-ended portion, a chain link holder member slidably mounted in said open ended portion of said block, said chain link holder member portion comprising a head portion having a groove-shaped shelf to engage the opposite sides of a chain link having a sprue portion to be removed and an adjacent cooperating elongated slot for slidably receiving chain links connected with the sprue link and whereby the sprue portion is held upwardly, and means for moving said chain link holder member in position to engage said chain link to be machined and hold the same firmly in said chain supporting open slot portion while said chain and link is moved as a unit past said milling station and said milling tool operated to machine off the sprue portion, said slot for slidably receiving the chain links being in the shape of a cross as viewed in cross section and wherein the cooperating elongated slots for accommodating the chain links are disposed below the surface of said chain supporting table and such as to accommodate both the horizonal and vertically disposed chain links and expose the sprue link portion above the top of said longitudinally extending open slot for the milling off of said sprue.

5. In a machine for cutting and machining the sprue portion from cast aluminum or bronze chain links in a chain length as said chain is moved along past a milling station which includes mechanism for supporting said chain and positioning each link of the chain having a sprue to be removed, said mechanism comprising a chain supporting table, said table comprising a longitudinally extending open slot for receiving and guiding said chain length therealong, an adjustable chain guide block having a slotted head portion cooperating with said open slot chain supporting table means for slidably positioning said chain, a cylinder block comprising an inner open ended portion, a chain link holder member slidably mounted in the open end of said cylinder block, said chain link holder member comprising an integral shelf which is provided with longitudinally spaced grooves therein for engaging the opposite sides of a chain link to be machined and having an adjacent cooperating elongated slot for slidably receiving chain link interconnected with the sprue link, and means for moving said chain link member in position to engage the chain link in said spaced grooves and clamp the same firmly in said longitudinally extending open slot while said chain and link is moved as a unit, said slot for slidably receiving the chain links being in the shape of a cross as viewed in cross section and wherein the cooperating elongated slots for accommodating the chain links are disposed below the surface of said chain supporting table and such as to accommodate both the horizontal and vertically disposed chain links and expose the sprue link portion above the top of said longitudinally extending open slot for the milling off of said sprue.

6. In a machine for cutting and machining the sprue portion from cast aluminum or bronze chain links in a chain length as said chain is moved along past a milling station which includes mechanism for supporting said chain and positioning each link of the chain having a sprue to be removed, said mechanism comprising a chain supporting table and a rotary cutting tool having a U-shaped working surface, said table comprising a longitudinally extending open slot for receiving and guiding said chain length therealong, an adjustable chain guide block having a slotted head portion cooperating with said open slot chain supporting table means for slidably positioning said chain, a cylinder block comprising an inner open ended portion, a chain link holder member slidably mounted in the open end of said cylinder block, said chain link holder member comprising a spring actuated head portion consisting of a shelf with spaced grooves therein for engaging the opposite side portion of a chain link which is to be machined and having an adjacent cooperating elongated slot for slidably receiving chain link interconnected with the sprue link, means for moving said chain link, said slot for slidably receiving the chain links being in the shape of a cross as viewed in cross section and wherein the cooperating elongated slots for accommodating the chain links are disposed below the surface of said chain supporting table and such as to accommodate both the horizontal and vertically disposed chain links and expose the sprue link portion above the top of said longitudinally extending open slot for the milling off of said sprue holder member member comprising a rack and pinion gear operatively connected thereto and operable to draw said chain link holder and chain length over said table and past said milling station, lever means for shifting said cylinder block to yieldably position said chain link holder member carried thereby, and means comprising a wheel operable for rotating said pinion gear to shift said rack.

References Cited in the file of this patent

UNITED STATES PATENTS

| | | |
|---|---|---|
| 528,819 | Standish | Nov. 6, 1894 |
| 728,119 | Leuenberger | May 12, 1903 |
| 1,292,157 | Townsend | Jan. 21, 1919 |
| 1,833,444 | Stuller | Nov. 24, 1931 |
| 1,881,966 | Phelps | Oct. 11, 1932 |
| 2,125,967 | Taylor | Aug. 9, 1938 |